Patented May 27, 1947

2,421,243

UNITED STATES PATENT OFFICE 2,421,243

VULCANIZATION ACCELERATOR

Ernest B. Curtis, Yonkers, N. Y., assignor to R. T. Vanderbilt Co. Inc., New York, N. Y., a corporation of New York No Drawing. Application March 24, 1945, Serial No. 584,721

4 Claims. (Cl. 260—785)

One of the more valuable accelerators used in the vulcanization of rubber, natural and synthetic, is benzo thiazyl disulfide. It is useful particularly in the production of vulcanized rubber goods which must have superlative resistance to ageing. It is also relatively inactive at lower vulcanization temperatures although highly active at higher temperatures, a property which permits its use, in conjunction with other accelerators, to provide close control of vulcanization rates in products including thick sections or sections of widely different thickness. However, it has three properties which are distinct disadvantages and which have limited its application in some instances.

Benzo thiazyl disulfide tends to stick to metal, to mill rolls for example. It is difficult to disperse thoroughly, particularly in synthetic rubber such as GR–S (butadiene-styrene copolymer type). It flies badly in the mill room. The second of these properties is to some extent related to the first. When, on the mill used to disperse the compounding materials in the rubber, the benzo thiazyl disulfide sticks to the mill rolls, it forms agglomerates, flakes and filaments for example, which persist and resist dispersion. The tendency to stick to metal and to resist dispersion, at least at the level at which these tendencies are exhibited by benzo thiazyl disulfide, appear to be peculiar to benzo thiazyl disulfide. For example, mercapto benzo thiazole, although closely related chemically, does not exhibit these tendencies to anything like the same extent.

The conventional formula for benzo thiazyl disulfide is:

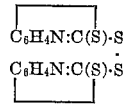

That for mercapto benzo thiazole is:

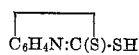

Synthetic rubbers such as GR–S do not break down on milling the way natural rubber does and consequently dispersion problems, such as the dispersion of benzo thiazyl disulfide, are exaggerated in the compounding, for vulcanization, of such synthetic rubbers.

It has been conventional practice, for many years, to oil benzo thiazyl disulfide by admixture for example of about 2% of a light mineral oil to reduce its tendency to fly. This expedient has satisfactorily accomplished this intended purpose but, notwithstanding the fact that oils are frequently used as plasticizers, such oiling actually tends to increase the tendency of benzo thiazyl disulfide to stick to metal and to resist dispersion.

I have discovered that I can eliminate this tendency to stick to metal, that I can get good dispersion of the accelerator quickly and easily, that I can reduce the tendency to fly, and that I can accomplish these ends without in any way impairing the value of the material as an accelerator by thoroughly incorporating an appropriate proportion of zinc stearate in the benzo thiazyl disulfide. I have found that the minimum proportion approximates 1% by weight on the benzo thiazyl disulfide and the maximum approximates 2% for optimum results. More than 2% can be used, proportions of as much as 5% can be used without detriment, but proportions above about 2% are not necessary to secure my improved results. The benzo thiazyl disulfide modified by the incorporation of about 1%–2% of zinc stearate remains a powder and can be handled as in conventional practice. The experienced mill room worker, however, will immediately notice the improved ease of dispersion of the accelerator and the quicker formation of a smooth and uniform compound on the mill.

Thus my invention is a new accelerator compound, a pulverulent mixture of benzo thiazyl disulfide and zinc stearate in which the proportion of zinc stearate approximates 1%–5% or better 1%–2% by weight on the benzo thiazyl disulfide.

The zinc stearate may be incorporated in the benzo thiazyl disulfide by addition to the pulverulent accelerator followed, for example, by tumbling. However, I have found it advantageous to incorporate the zinc stearate as part of the grinding operation for reducing the benzo thiazyl disulfide to appropriate particle size, say all through the standard 100 mesh screen.

Benzo thiazyl disulfide is produced by oxidation of mercapto benzo thiazole. The oxidation is usually carried out with nitrous oxide in an aqueous suspension pH about 5.5 or with chlorine or hydrogen peroxide in an aqueous solution of the sodium salt pH about 7–7.5. The reaction product, benzo thiazyl disulfide, is insoluble in water and, upon completion of the reaction, is separated from the resulting slurry in a filter press or a centrifuge as a cake which is washed substantially free of salts with water. Traces of impurities usually remain, these comprising benzo thiazole, anilino benzo thiazole, mercapto benzo thiazole, sodium sulfate, sodium chloride where the oxidation is with chlorine and sodium nitrite or sodium nitrate where the oxidation is with nitrous oxide. The cake is then dried at a temperature well below the sintering point, say about 140° C., to a water content not usually exceeding about 0.5% by weight on the cake. The dried cake is then conveyed to a pulverizing mill. The product from this mill is the commercial product, benzo thiazyl disulfide.

In my preferred practice, I either introduce the zinc stearate, in appropriate quantities or at an appropriate rate, into the pulverizing mill with the dried cake or introduce the zinc stearate, in such quantities or at such rates, into the slurry from which the cake, subsequently dried and conveyed to the pulverizing mill, is separated in the foregoing practice. A wetting agent may be used with advantage if the zinc stearate, is introduced into the aqueous slurry before separation of the cake.

The "master batch" method of handling compounding materials has been used with great success with many materials for many years. In this practice the compounding material is first predispersed in a limited proportion of rubber to produce a master batch of the material in a state of dispersion but in high concentration and the compounding material is then added to the primary rubber compound by appropriate additions of this master batch.

Satisfactory master batches of benzo thiazyl disulfide have not hitherto been produced although many attempts have been made over a period of many years. Satisfactory master batches are readily produced with my new compound.

I have tried a number of similar stearates, specifically lithium, calcium, barium, magnesium, and aluminum stearates as addends to benzo thiazyl disulfide in the same proportions giving optimum results with zinc stearate. The resulting compounds exhibit reduced tendency to stick to metal and to resist dispersion and less tendency to fly. Zinc stearate, however, is more effective than any of these others.

I claim:

1. An accelerator compound consisting essentially of a pulverulent mixture of benzo thiazyl disulfide and zinc stearate in which the proportion of zinc stearate approximates 1%–2% by weight on the benzo thiazyl disulfide.

2. An accelerator compound consisting essentially of a pulverulent mixture of benzo thiazyl disulfide and a stearate of the class consisting of zinc, lithium, calcium, barium, magnesium and aluminum in which the proportion of stearate approximates 1%–2% by weight on the benzo thiazyl disulfide.

3. An accelerator compound consisting essentially of a pulverulent mixture of benzo thiazyl disulfide and zinc stearate in which the proportion of zinc stearate approximates 1%–5% by weight on the benzo thiazyl disulfide.

4. An accelerator compound consisting essentially of a pulverulent mixture of benzo thiazyl disulfide and a stearate of the class consisting of zinc, lithium, calcium, barium, magnesium and aluminum in which the proportion of stearate approximates 1%–5% by weight on the benzo thiazyl disulfide.

ERNEST B. CURTIS.

REFERENCES CITED

The following references are of record in the file of this patent:

UNITED STATES PATENTS

| Number | Name | Date |
| --- | --- | --- |
| 2,343,835 | Smith et al. | Mar. 7, 1944 |
| 1,583,761 | Sebrell | May 4, 1926 |
| 2,368,522 | Cornell et al. | Jan. 30, 1945 |